United States Patent
Ziskind et al.

(10) Patent No.: US 8,635,493 B2
(45) Date of Patent: Jan. 21, 2014

(54) HIGH AVAILABILITY SYSTEM ALLOWING CONDITIONALLY RESERVED COMPUTING RESOURCE USE AND RECLAMATION UPON A FAILOVER

(75) Inventors: Elisha Ziskind, Sharon, MA (US); Guoqiang Shu, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 351 days.

(21) Appl. No.: 13/109,300

(22) Filed: May 17, 2011

(65) Prior Publication Data

US 2012/0297236 A1    Nov. 22, 2012

(51) Int. Cl.
*G06F 11/00* (2006.01)

(52) U.S. Cl.
USPC .......................................................... 714/13

(58) Field of Classification Search
USPC ........ 714/4.2, 4.21, 4.3, 4.4, 6.13, 11–16, 26, 714/31, 32, 39, 41, 48
See application file for complete search history.

(56) References Cited

U.S. PATENT DOCUMENTS

| | | | | |
|---|---|---|---|---|
| 5,805,790 | A * | 9/1998 | Nota et al. | 714/10 |
| 6,587,970 | B1 * | 7/2003 | Wang et al. | 714/47.2 |
| 2004/0243915 | A1 * | 12/2004 | Doyle et al. | 714/796 |
| 2008/0189700 | A1 * | 8/2008 | Schmidt et al. | 718/1 |
| 2009/0249284 | A1 * | 10/2009 | Antosz et al. | 717/104 |
| 2009/0249354 | A1 * | 10/2009 | Yamaguchi et al. | 718/106 |
| 2010/0083015 | A1 * | 4/2010 | Yokota et al. | 713/310 |
| 2011/0214005 | A1 * | 9/2011 | Biran et al. | 714/1 |

* cited by examiner

*Primary Examiner* — Nadeem Iqbal (57) ABSTRACT

In one embodiment, a method attempts, by a computing device, to determine a placement of a set of virtual machines on available hosts upon failure of a host. The placement considers the set of virtual machines as being not powered on any of the available hosts. The method further determines, by the computing device, a placed list of virtual machines in the set of virtual machines as a recommendation to power on to the available hosts. The determination of the placed list of virtual machines is used to determine a power off list of virtual machines in the set of virtual machines to power off, wherein virtual machines in the power off list of virtual machines are currently powered on available hosts but were considered to be powered off to determine the placement.

15 Claims, 8 Drawing Sheets

HIGH AVAILABILITY SYSTEM ALLOWING CONDITIONALLY RESERVED COMPUTING RESOURCE USE AND RECLAMATION UPON A FAILOVER

BACKGROUND

High availability systems provide high availability for applications running in virtual machines. In the event of a host failure, affected virtual machines are automatically restarted on other hosts with spare capacity. Additionally, if there is an operating system (OS)-related failure within a virtual machine, the failure is detected, and the affected virtual machine is re-started on the same host. The high availability system may include a distributed monitoring solution that continuously monitors all hosts and detects host failures.

The high availability system may leverage a cluster of hosts, which aggregates computing resources for the hosts in a resource pool. Hosts in the cluster are monitored and in the event of a failure, virtual machines on a failed host are re-started on alternate hosts in the cluster. The computing resources in the cluster are managed as if they resided on a single host. Thus, when a virtual machine is re-started, the virtual machine may be given resources from other hosts in the cluster rather than be tied to a specific host that might have failed.

The high availability system includes an agent on every host of the cluster. The agents communicate with each other using heartbeat messages to monitor the aliveness of the hosts in the cluster. A loss of the heartbeat message may indicate that a host has failed. When a host failure is detected, the virtual machines running on that host are failed over. For example, virtual machines are re-started on an alternate host with the most available unreserved capacity, e.g., available computer processing unit (CPU) and memory resources.

The high availability system ensures that sufficient spare computing resources are available in the resource pool at all times to be able to re-start virtual machines on different hosts in the event of a host failure. These spare computing resources are allocated beforehand and are always kept unused. For example, a user may specify that the high availability system needs to have enough spare computing resources to handle a failure of a certain number of hosts. In one example, the user may specify that computing resources to failover the failure of two hosts are needed. In this case, spare computing resources in the resource pool needed for failover of two hosts are not used. Admission control may then be used to prevent the use of the spare computing resources. This results in inefficient hardware and power utilization.

SUMMARY

In one embodiment, a method determines a first set of virtual machines and a second set of virtual machines. The first set of virtual machines is associated with a first priority level and the second set of virtual machines is associated with a second priority level. A first set of computing resources and a second set of computing resources are associated with a set of hosts. The computing resources of the first set are designated as available for placement of virtual machines and the computing resources of the second set are designated as conditionally available for placement of virtual machines. The virtual machines of the first set are powered on the first set of computing resources and at least a portion of the second set of virtual machines is powered on the second set of computing resources. Upon determining a failure of a host in the set of hosts, the method performs: generating, by a computing device, a power off request for one or more of the at least a portion of the second set of virtual machines powered on the second set of computing resources and generating, by the computing device, a power on request for one or more virtual machines from the first set of virtual machines that were powered on the failed host, the power on request powering on the one or more virtual machines from the first set of virtual machines on the at least a portion of the second set of computing resources.

In one embodiment, a placement list of virtual machines to be failed over due to failure of the host is determined. The placement list includes virtual machines from the first set of virtual machines. A power off list of virtual machines is determined. The power off list including virtual machines from the second set of virtual machines. The power off list is added to the placement list. The placement list is used to determine a placed list of virtual machines that are recommended to be powered on.

In another embodiment, a method attempts, by a computing device, to determine a placement of a set of virtual machines on available hosts upon failure of a host. The placement considers the set of virtual machines as being not powered on any of the available hosts. The method further determines, by the computing device, a placed list of virtual machines in the set of virtual machines as a recommendation to power on to the available hosts. The determination of the placed list of virtual machines is used to determine a power off list of virtual machines in the set of virtual machines to power off, wherein virtual machines in the power off list of virtual machines are currently powered on available hosts but were considered to be powered off to determine the placement.

In one embodiment, the available hosts include a first set of available computing resources and a second set of conditionally available computing resources. Virtual machines in the power off list of virtual machines are powered on the second set of conditionally available hosts prior to being powered off.

In one embodiment, the method includes receiving a placement list including the set of virtual machines. The placement list includes virtual machines from the failed host and a subset of virtual machines currently powered on available hosts but is considered as being powered off to determine the placement.

In another embodiment, a system includes a placement manager configured to: determine a placement list of virtual machines to be failed over due to failure of a host in a set of hosts, determine a power off list of virtual machines powered on to available hosts in the set of hosts, and add the power off list to the placement list. The system also includes a placement engine configured to: determine a placement of a set of virtual machines for available hosts in the set of hosts, wherein the placement considers virtual machines in the placement list of virtual machines as being not powered on any of the available hosts; and generate a placed list of virtual machines based on the placement. The placement manager is then configured to: remove virtual machines in the power off list from the placed list of virtual machines, generate power off requests for virtual machines in the power off list but not in the placed list of virtual machines, and generate power on requests for virtual machines remaining in the placed list of virtual machines.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1:
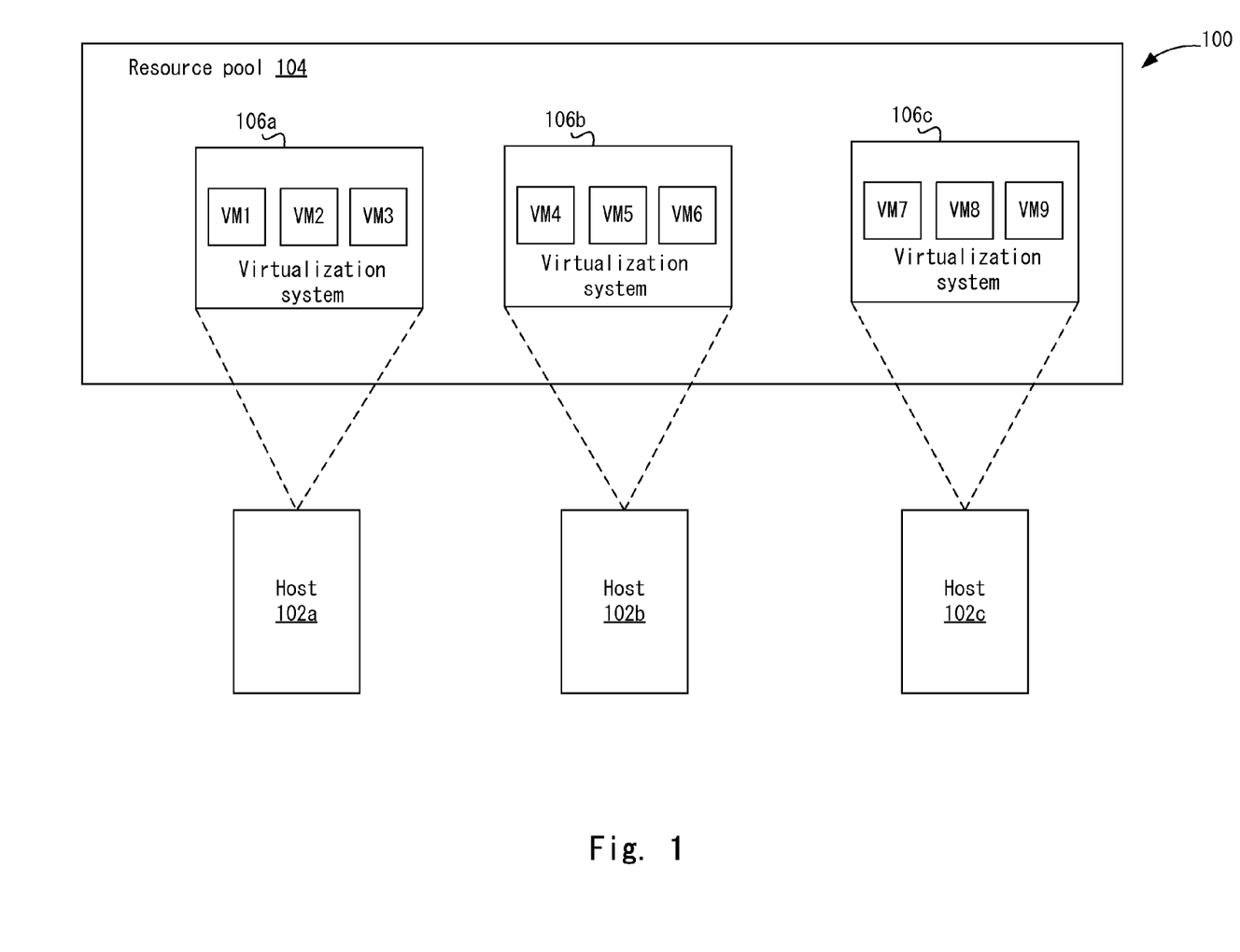
FIG. 1 depicts a system for providing high availability according to one embodiment.

FIG. 1 depicts a system 100 for providing high availability according to one embodiment. Hosts 102 may be computing devices, such as physical servers. In one embodiment, computing resources of hosts 102 are pooled in resource pool 104. Computing resources of each host 102 may be virtualized in virtualization systems 106a-106c, respectively. Virtualization systems 106 may be implemented using virtualization software executing on corresponding hosts 102. Also, virtualization systems 106a-c have virtual machines (VM1-VM9) running on them. The virtual machines include an application running on an operating system.

Particular embodiments allow computing resources that may have been conventionally reserved for a failover process to be used by virtual machines when a failover occurs. For example, computing resources may be designated as conditionally available. Conditionally available computing resources may be used by a certain designated type of virtual machine, such as a low priority virtual machine. In one embodiment, other types of virtual machines, such as high and medium priority virtual machines, may not use the conditionally available computing resources. Upon a failover situation in which a host 102 fails and virtual machines from the failed host need to be failed over (e.g., moved to a new host 102), the conditionally available computing resources may be reclaimed on demand. For example, low priority virtual machines may be powered off or suspended to make computing resources available for failed over medium and high priority virtual machines. The medium and high priority virtual machines may be considered to be running more critical applications and thus it is desirable to failover medium and high priority virtual machines at the expense of low priority virtual machines. This process will be described in more detail below.

In one embodiment, resource pool 104 may be used to pool computing resources of a cluster of hosts 102. The computing resources of resource pool 104 may appear as one or more computing systems. Although resource pool 104 is discussed, system 100 may not use resource pool 104. The computing resources may be categorized into different levels. For example, the computing resources may be designated as conditionally available or available. Available resources are computing resources that are available for placement of virtual machines without any failover constraints.

In one embodiment, a priority level may also be assigned to virtual machines. The priority level is used to determine if virtual machines can be assigned to conditionally available computing resources. For example, high, medium, and low priority levels may be used. In one embodiment, one of these priority levels may be designated as being acceptable for assignment to the conditionally available computing resources. For example, low priority virtual machines may be deployed on the conditionally available computing resources. However, when a failure of a host 102 occurs, the low priority virtual machines may be powered off to free computing resources for higher priority (e.g., high priority and medium priority) virtual machines.

Although low, medium, and high priority virtual machines are discussed, other priority levels may be used. For example, a first priority may be assigned to virtual machines that can use conditionally available computing resources. A second priority level may be assigned to virtual machines that use the available computing resources, but during a failure, can use the conditionally available computing resources. Also, although low priority virtual machines are discussed as being powered on to conditionally available computing resources, the low priority virtual machines may also use available computing resources. In a failover situation, the low priority virtual machines powered on available computing resources may also be powered off to free computing resources for high and medium virtual machines. This frees more computing resources to power on higher priority virtual machines.

Figure 2:
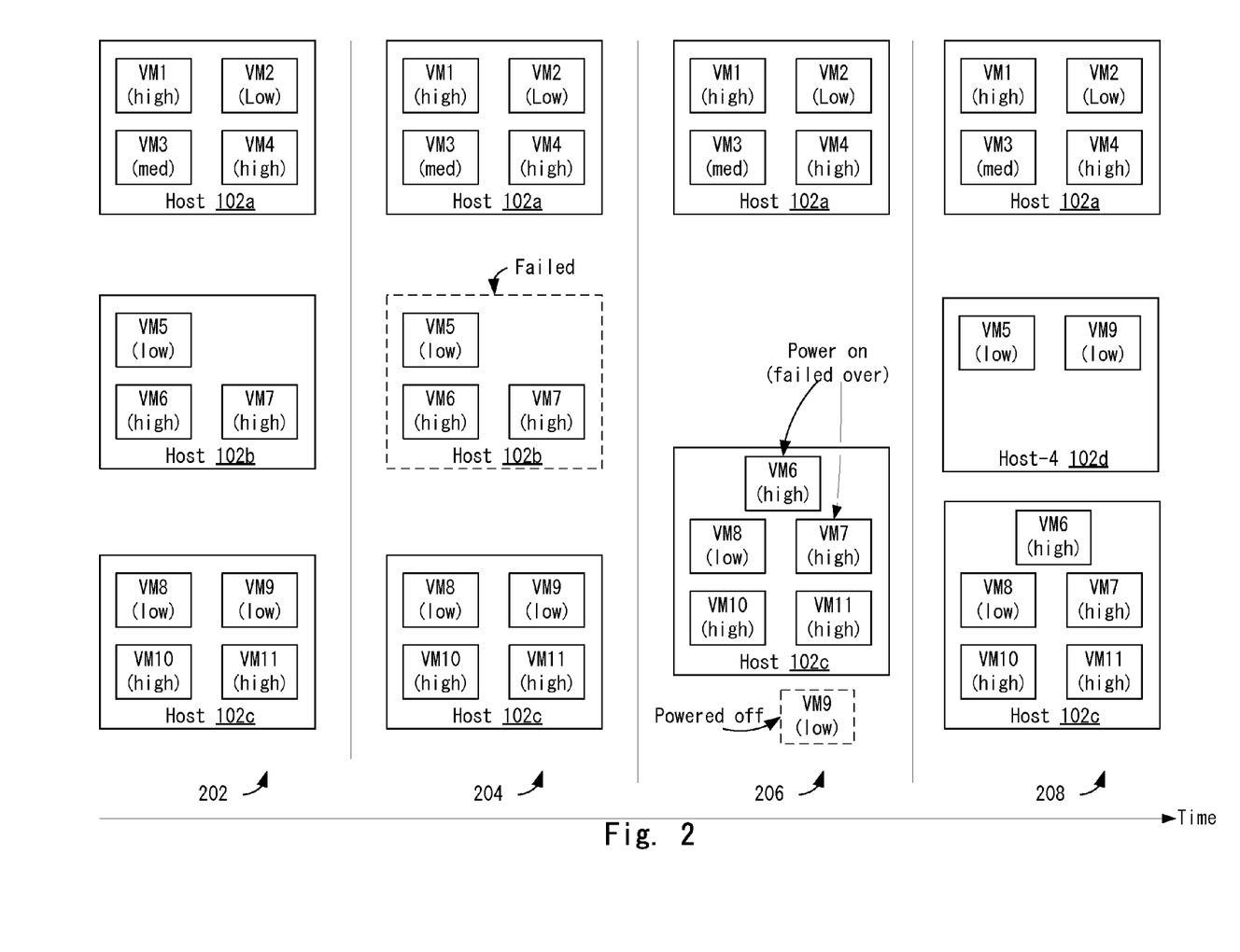
FIG. 2 shows an example of the handling of a failure of a host according to one embodiment.

FIG. 2 shows an example of the handling of a failure of a host 102 according to one embodiment. A time line proceeds from left to right in FIG. 2. At a first time shown at 202, all three hosts 102a-102c are running. This is before a failure has occurred.

Each host 102a-c has virtual machines (VMs) running on them. For example, host 102a includes virtual machines VM1-VM4, host 102b includes virtual machines VM5-VM7, and host 102c includes virtual machines VM8-VM11. A priority level is assigned to each virtual machine. For example, virtual machine VM1 is assigned a low priority, virtual machine VM3 is assigned a medium priority, virtual machine VM4 is assigned a high priority. This priority level may be assigned using metadata associated with the virtual machines.

In this example, low priority virtual machines may be powered on to conditionally available computing resources that are designated for a failover situation. The conditionally available computing resources may be determined based on an amount of resources that are reserved for a failure. For example, enough resources for a failover of two hosts 102 may be designated and this amount of resources is then considered conditionally available.

At a second time shown at 204, host 102b has failed. Host 102b includes virtual machines VM5, VM6, and VM7. Virtual machines VM6 and VM7 are of a high priority and virtual machine VM5 is of a low priority.

Particular embodiments then attempt to place virtual machines VM5, VM6, and VM7 on available hosts 102a and 102c. At a third time shown at 206, virtual machines have been reallocated on hosts 102a and 102c. For example, virtual machines VM6 and VM7 have been powered on and placed on host 102c. A low priority virtual machine VM9 was powered off due to scarcity of computing resources. That is, virtual machine VM9 was previously powered on conditionally available computing resources before the failure and virtual machine VM9 is now powered off so that high priority virtual machines VM6 and VM7 may be powered on host 102c. Low priority virtual machine VM5 could not be placed on either host 102a or 102c due to the lack of computing resources. However, more critical high priority virtual machines VM6 and VM7 were failed over to host 102c. Because virtual machines VM6 and VM7 are of a higher priority than low priority virtual machines VM5 and VM9, it is more desirable situation to power on the higher priority virtual machines.

Low priority virtual machine VM2 is still powered on host 102a. In one embodiment, low priority virtual machines are not powered off to free computing resources for other low priority virtual machines. This may create extra work that is unnecessary. However, in some cases, low priority virtual machines may be powered off to power on other low priority virtual machines. For example, a powered off low priority virtual machine may be considered more important than a powered on low priority virtual machine and is thus powered on.

All powered off virtual machines and virtual machines that could not be failed over may be tracked and powered on again if there are enough computing resources available in the future. For example, after the failover is processed, a new host 102d may come online. At this point, virtual machines that were not powered on due to a scarcity of computing resources may be powered on to the new host. For example, at a fourth time shown at 208, new host 102d is added. Virtual machines VM5 and VM9 are then powered on to host 102d.

Figure 3:
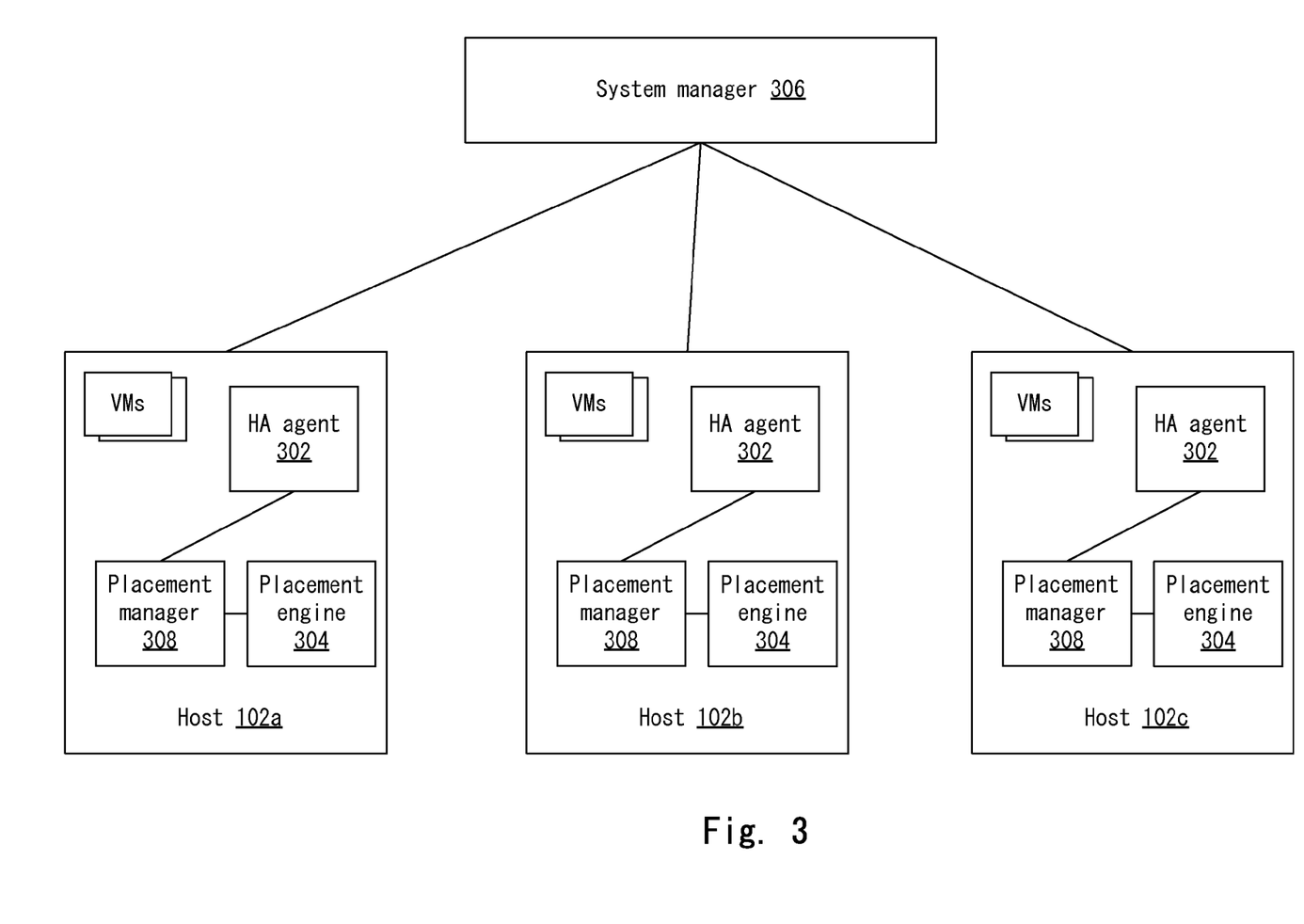
FIG. 3 shows a more detailed example of the system according to one embodiment.

The detection of a failure and the placement of virtual machines will now be discussed in more detail. FIG. 3 shows a more detailed example of system 100 according to one embodiment. Hosts 102 include a high availability (HA) agent 302, a placement engine 304, and a placement manager 308. Virtual machines in virtualization systems 106 are shown running on each host 102. A system manager 306 may be used to configure the high availability system in one example. Also, functions described as being performed by hosts 102 may also be performed by system manager 306 or other entities.

In one embodiment, HA agents 302 may communicate with each other using a heartbeat message. The heartbeat message may be sent at predetermined intervals among HA agents 302. In one embodiment, a master HA agent 302 is designated and other HA agents 302 are designated as slaves. The master HA agent 302 determines when a failure of a host 102 occurs based on the heartbeat messages that are received. When master HA agent 302 does not receive a heartbeat message from a slave HA agent 302 at a host 102 after a predetermined time period, then a failure may be determined. In the event of a failure of master HA agent 302, a designated slave HA agent 302 may take over as the master and determine a failure. This may occur when a slave HA agent 302 does not receive a heartbeat message from the master HA agent 302.

Upon determination of a failure, a failover request is generated by HA agent 302. For example, master HA agent 302 may notify placement manager 308 of a failure of a specified host 102. Placement manager 308 then generates a failover request for placement engine 304. The failover request may include a placement list of virtual machines that need to be powered on. The placement list includes the virtual machines that were located on to a failed host 102. Additionally, particular embodiments determine a power off list of low priority virtual machines that have been powered on to conditionally available computing resources. These powered on low priority virtual machines are included in the placement list even though the low priority virtual machines may be currently powered on. As will be discussed in more detail below, placement engine 304 attempts to place currently powered on low priority virtual machines (along with low, medium, and high priority virtual machines that need to be failed over) and the result of the placement is used to determine if a portion of the low priority virtual machines should be powered off.

Figure 4:
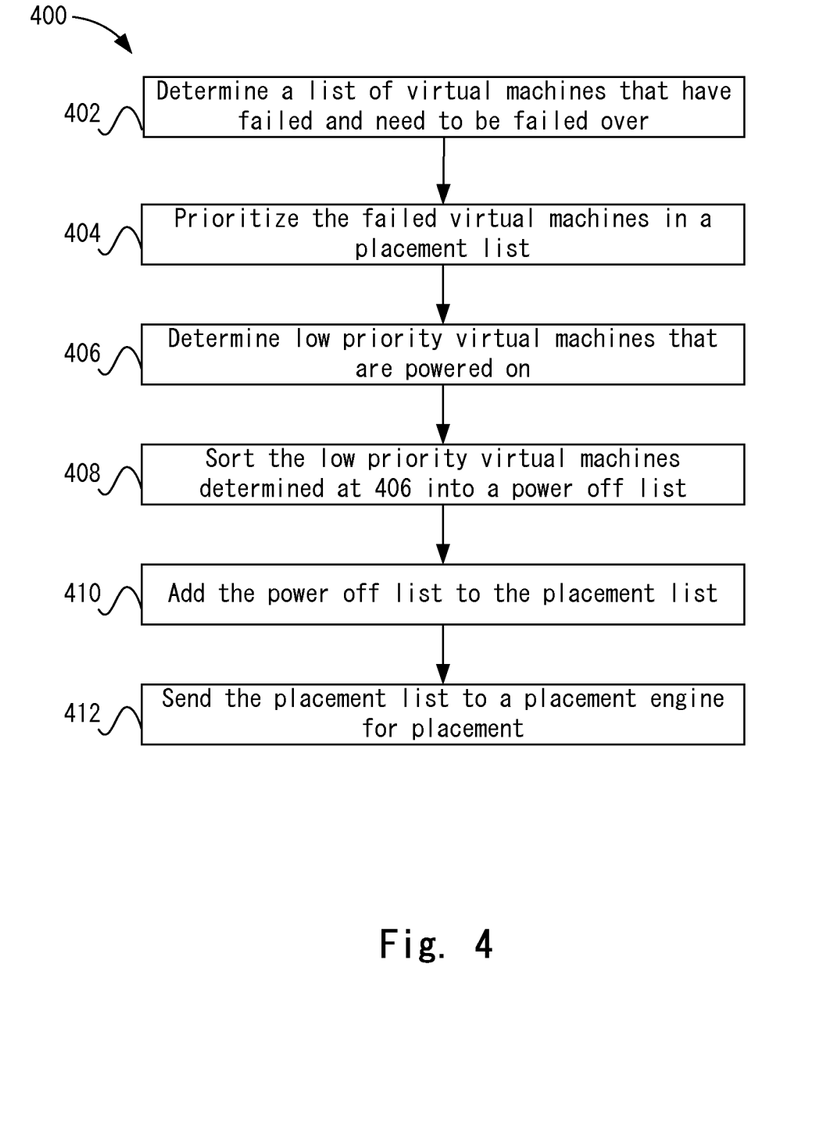
FIG. 4 depicts a simplified flowchart of a method for generating the placement list of virtual machines to include in the failover request according to one embodiment.

FIG. 4 depicts a simplified flowchart 400 of a method for generating the placement list of virtual machines to include in the failover request according to one embodiment. At 402, placement manager 308 determines a list of virtual machines that have failed and need to be failed over. For example, the list may be received with the failover request from HA agent 302. Also, placement manager 308 may maintain a list of virtual machines that were powered on to a failed host 102 and determine that those virtual machines need to be failed over upon receiving notice that a host 102 has failed. Further, placement manager 308 may communicate with system manager 306 to determine the list of failed virtual machines.

At 404, placement manager 306 prioritizes the failed virtual machines. Different criteria may be used to order the list of virtual machines. For example, the list of virtual machines may be ordered from virtual machines considered to be of the highest priority to virtual machines considered to be of the lowest priority. Other ways of ordering the virtual machines may be appreciated. For example, within the priority levels, the virtual machines may be ordered by different criteria. In one example, within a priority level, virtual machines may be ordered from the smallest virtual machines to the largest. The size of the virtual machine may be defined based on different contexts, such as memory overhead plus reservation. The smallest to largest ordering is performed because it may be desirable to place smaller virtual machines first, which would allow more virtual machines to be placed than if larger virtual machines are placed first. The ordered list determined at 404 may be considered the placement list.

At 406, placement manager 308 determines low priority virtual machines that are powered on. For example, all low priority virtual machines that are still powered on to any of hosts 102 are determined. At least some of these low priority virtual machines have been powered on to conditionally available computing resources. Any low priority virtual machines may be candidates to be powered off because it may be more desirable to power on medium and high priority virtual machines than keeping low priority virtual machines powered on. Although all low priority virtual machines are described as being determined, only a portion of low priority virtual machines may be determined. For example, only low priority virtual machines determined to be powered on to conditionally available computing resources are determined.

At 408, the low priority virtual machines determined at 406 are sorted. For example, the powered on low priority virtual machines are sorted by size from smallest to biggest. As described above, the size may be defined based on different contexts, such as memory overhead plus reservation. This sorted list is considered the "power off list." Although the low priority virtual machines are sorted, the sort may not be performed. The low priority virtual machines are sorted from smallest to biggest in the power off list because as will be described later, the sorting favors powering off a smaller number of larger virtual machines. Powering off larger virtual machines frees more computing resources, which may create enough free computing resources for a failover with less virtual machines being powered off. This means there is less work to do to free up conditionally available computing resources and a failover may occur sooner.

At 410, the power off list is added to the placement list. In one embodiment, the power off list is inserted just before the low priority virtual machines that need to be failed over on the placement list. The power off list is added before the low priority virtual machines that need to be failed over because this ensures that already powered on low priority virtual machines are not powered off to power on other low priority virtual machines, which may cause unnecessary work. This may be deemed unnecessary because low priority virtual machines are of the same priority level and no preference is given. Thus, it is unnecessary to power off a low priority virtual machine to power on another low priority virtual machine.

Figure 5:
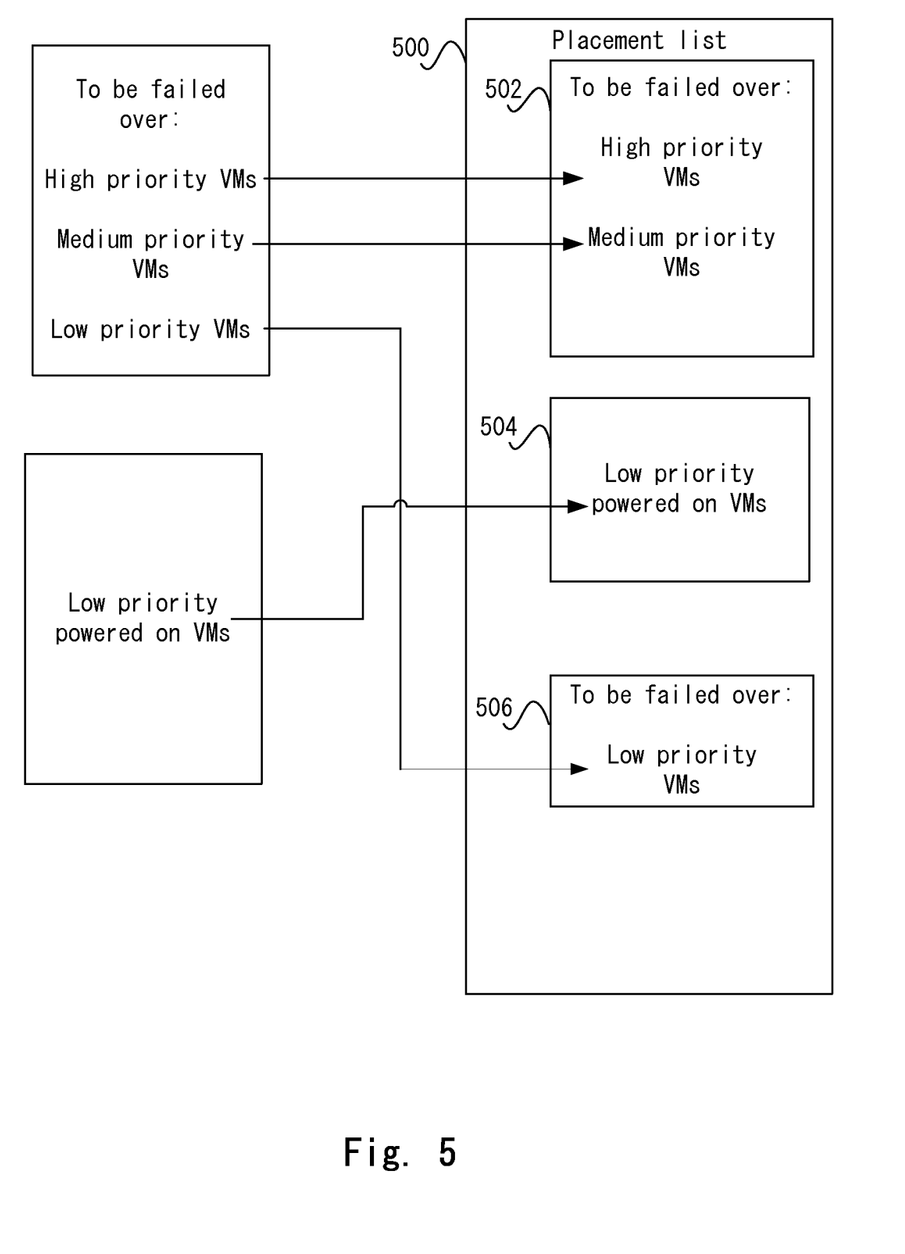
FIG. 5 depicts an example of a placement list according to one embodiment.

At 412, the placement list is sent to placement engine 304 for placement. FIG. 5 depicts an example of a placement list 500 according to one embodiment. A first section 502 of placement list 500 includes the high and medium priority virtual machines that need to be failed over. A second section 504 includes the low priority virtual machines that are still powered on. This is the power off list that has been inserted into placement list 500. In a third section 506, the low priority virtual machines that need to be failed over are included. As will be described in more detail below, placement engine 304 attempts to place virtual machines from first section 502 first, then second section 504, and finally third section 506.

Figure 6:
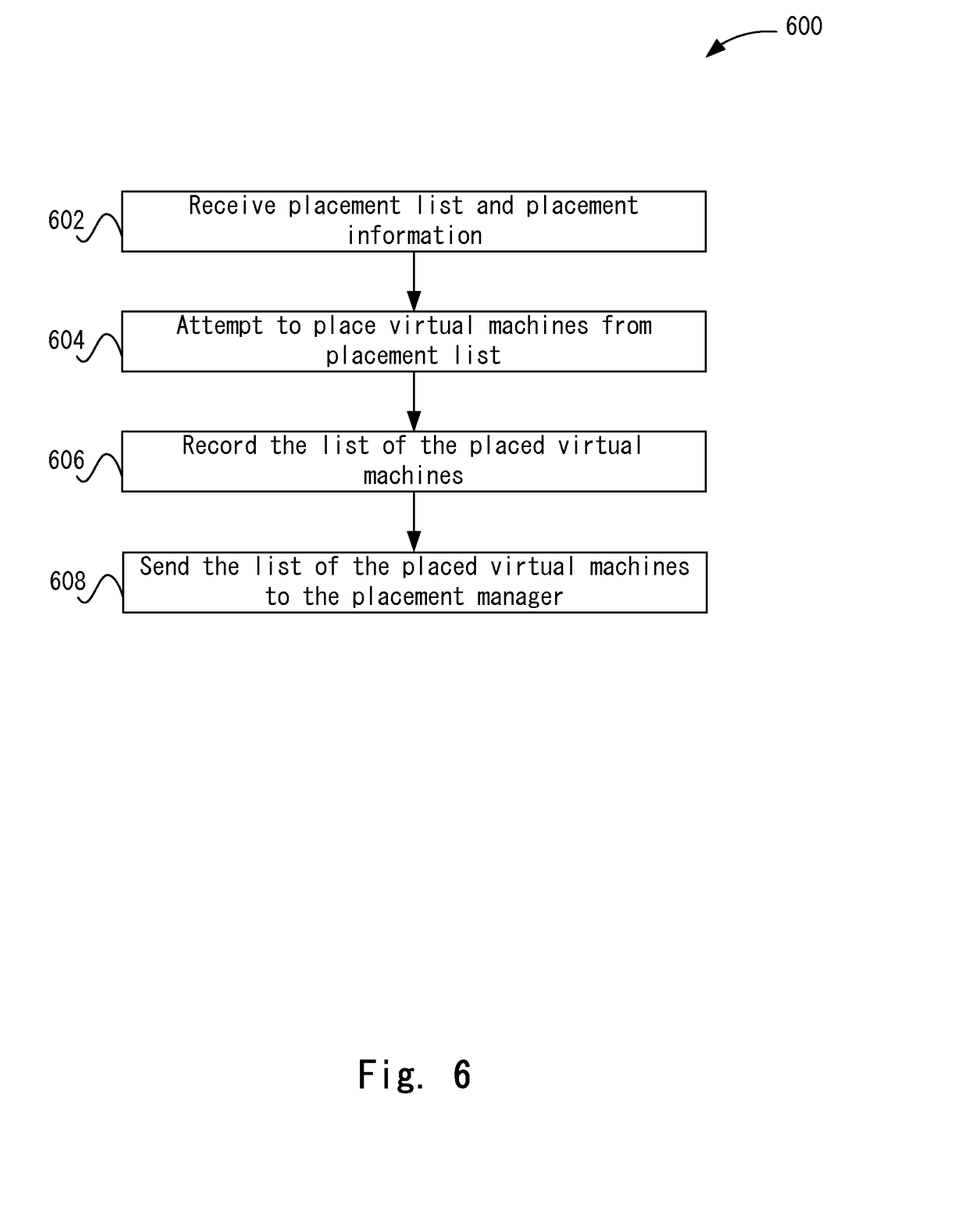
FIG. 6 depicts a simplified flowchart for determining a placement of virtual machines using the placement list according to one embodiment.

FIG. 6 depicts a simplified flowchart 600 for determining a placement of virtual machines using placement list 500 according to one embodiment. The placement determines hosts 102 on which virtual machines on placement list 500 should be placed. The placement generated by placement engine 304 is a recommendation to power on virtual machines and the placement recommendation is used to determine which low priority virtual machines to power off.

At 602, placement engine 304 receives placement list 500 and placement information. The placement information may include a list of available hosts 102 in system 100, the available computing resources for hosts 102, and a set of hosts 102 with which each virtual machine in placement list 500 is compatible. The list of available hosts 102 may be hosts 102 that have not failed in the cluster. The available computing resources are the computing resources that are currently not being used by list of available hosts 102. The available computing resources may need to be adjusted such that placement engine 304 believes that the low priority virtual machines that are currently powered on in the power off list are powered off and are not considered using computing resources. For example, some low priority virtual machines in the power off list are actually consuming computing resources on hosts 102 because they are powered on. However, these computing resources need to be assumed to be available so that virtual machines in placement list 500 can be placed on those computing resources. Thus, the list of available resources is then adjusted to include the computing resources being consumed by low priority virtual machines on the powered off list as being available computing resources. Another restriction may be that the low priority virtual machines on the powered off list may only be compatible with the current host 102 that each low priority virtual machine is currently powered on. This restriction is used because it is not desirable for placement engine 304 to place an already powered on low priority virtual machine on another host 102.

At 604, placement engine 304 attempts to place virtual machines from placement list 500. For example, placement engine 304 may start at the highest priority virtual machines and attempt to place the virtual machines from the highest priority to the lowest priority until the available computing resources have all been allocated. Placement engine 304 may use a placement algorithm to determine placement of virtual machines. For example, placement engine 304 schedules virtual machines for placement according to resource availability, any constraints for placement, and virtual machine priority.

At 606, placement engine 304 records the list of the placed virtual machines. At 608, the list of placed virtual machines is sent to placement manager 308.

Placement manager 308 uses the list of placed virtual machines that placement engine 304 recommended to be powered on to determine which low priority virtual machines to power off. For example, low priority virtual machines in the power off list may be powered off to free computing resources for high and medium priority virtual machines.

Figure 7:
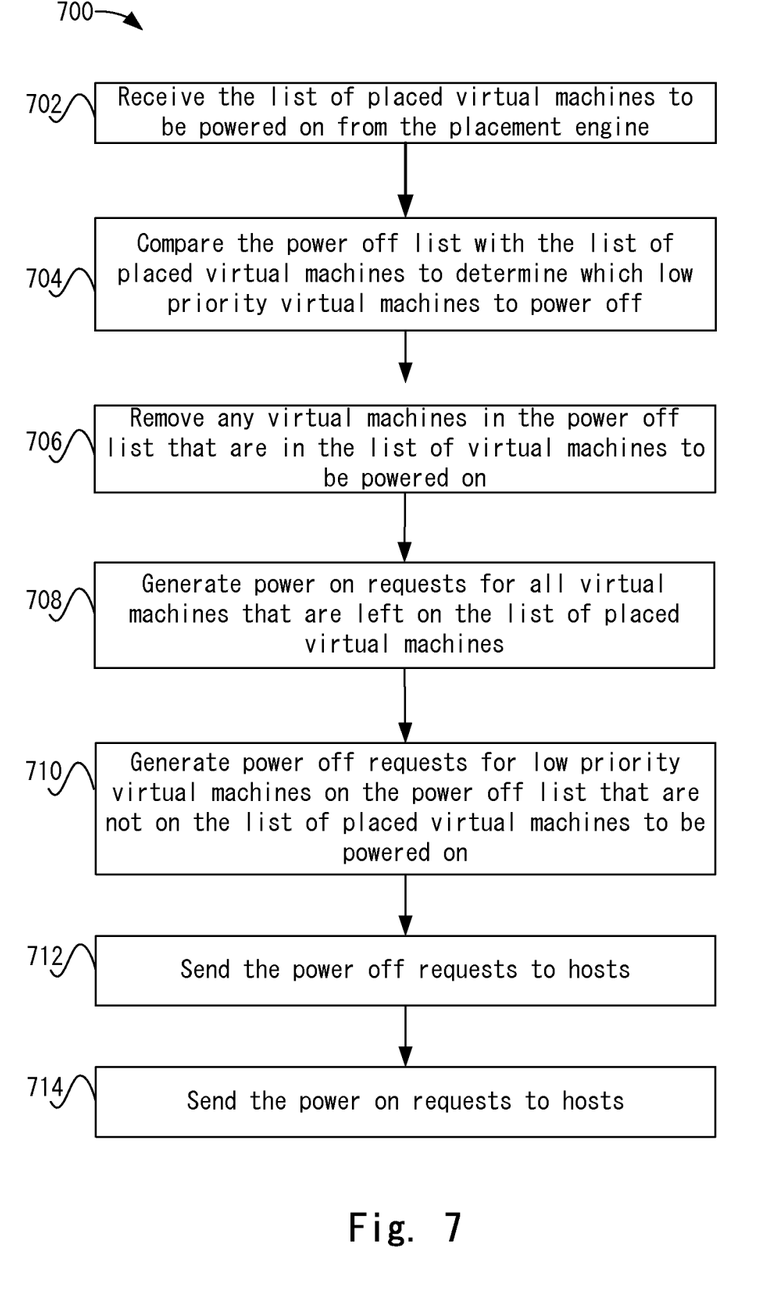
FIG. 7 depicts a simplified flowchart of a method for determining power on and power off requests according to one embodiment.

FIG. 7 depicts a simplified flowchart 700 of a method for determining power on and power off requests according to one embodiment. At 702, placement manager 308 receives the list of placed virtual machines to be powered on from placement engine 304.

At 704, placement manager 308 compares the power off list with the list of placed virtual machines to determine which low priority virtual machines to power off. For example, if placement engine 304 provides a placement for a low priority virtual machine on the power off list, this request is ignored because the low priority virtual machine is already powered on. Because of the constraint that powered on low priority virtual machines should be placed on the same host 102, placement engine 304 should recommend that a low priority virtual machine in the powered off list should be powered on to the current host in which the low priority virtual machine is running and thus no action is needed. If placement engine 308 did not provide a placement for a low priority virtual machine in the power off list, then it is treated as a recommendation to power off the low priority virtual machine because placement engine 304 has determined that higher priority virtual machines should be placed on computing resources being used by this low priority virtual machine. Thus, low priority virtual machines that have been powered on to conditionally available computing resources are powered off to make room for higher priority virtual machines. Consequently, at 706, placement manager 308 removes any virtual machines in the power off list that are in the list of virtual machines to be powered on. At 708, placement manager 308 generates power on requests for all virtual machines that are left on the list of placed virtual machines.

Some low priority virtual machines in the power off list may not have been placed. The low priority virtual machines that have not been placed then need to be powered off to free conditionally available computing resources. At 710, placement manager 308 generates power off requests for low priority virtual machines on the power off list that are not on the list of placed virtual machines to be powered on. At 712, placement manager 308 sends the power off requests to hosts 102. The power off requests may be sent first to free computing resources. At 714, placement manager 308 sends the power on requests to hosts 102.

In some cases, a master host 102 (e.g., the host that includes placement manager 308 and placement engine 306 that are determining the power on and power off requests) that is performing the failover process may fail. If the master host 102 fails immediately after a failure but before generating power on/power off requests, a new master host 102 will generate the power on and power off requests for the previously-failed hosts and the newly failed master host.

Figure 8:
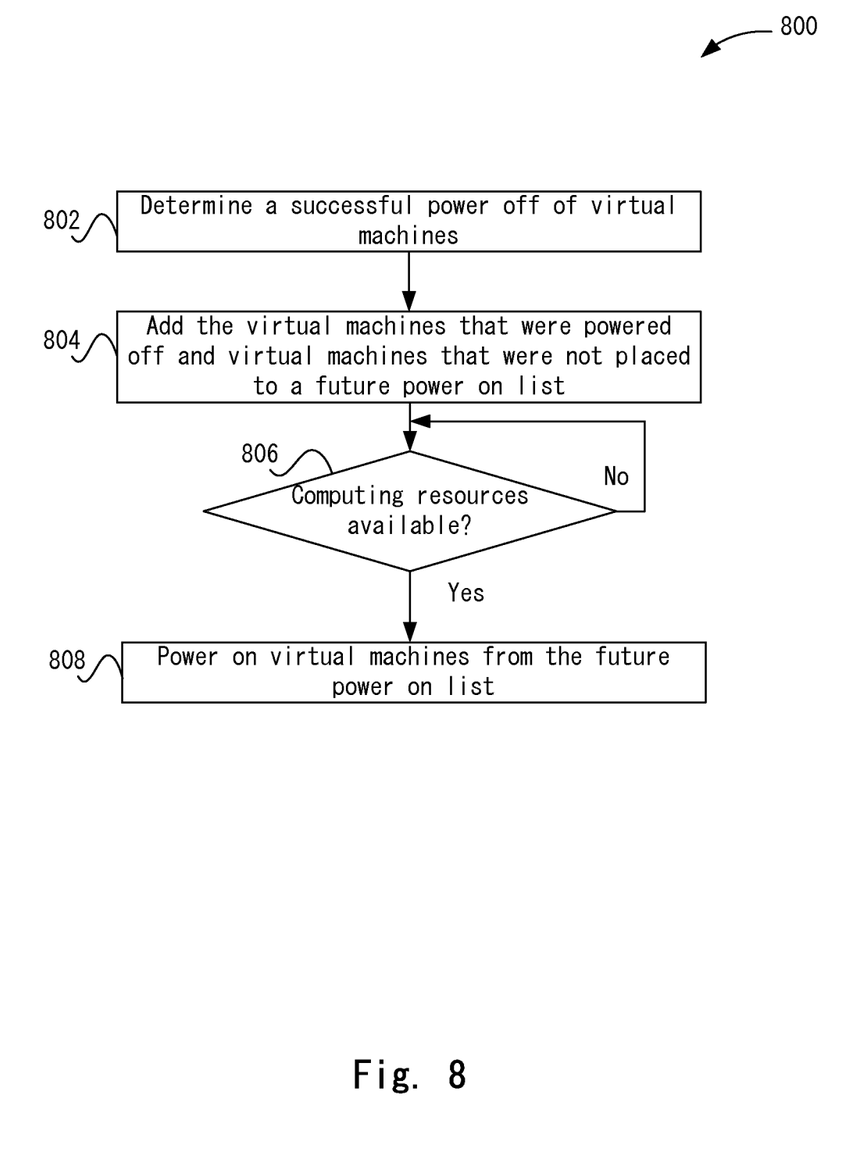
FIG. 8 depicts a simplified flowchart for powering on virtual machines after a failure has occurred according to one embodiment.

At some point additional computing resources may become available. Particular embodiments attempt to power on virtual machines that may have been powered off or not placed onto the additional computing resources. FIG. 8 depicts a simplified flowchart 800 for powering on virtual machines after a failure has occurred according to one embodiment. At 802, a successful power off of virtual machines is determined. These are the low priority virtual machines that are powered off to free computing resources for higher priority virtual machines. At 804, the virtual machines that were powered off and virtual machines that were not placed are added to a future power on list.

At 806, it is determined that enough computing resources are available. For example, when a new host 102 is powered on, computing resources may become available to power on some virtual machines. If enough computing resources are not available, the process reiterates to 806 until enough computing resources are available.

At 808, if enough resources become available, virtual machines from the future power on list are powered on. For example, low priority virtual machines that have been powered off may be powered on. Additionally, low priority virtual machines that were not failed over may also be powered on.

Accordingly, particular embodiments use a method of determining which virtual machines to power on to determine which low priority virtual machines to power off. That is, low priority virtual machines may be powered on to conditionally available resources. These low priority virtual machines are then included in a placement list that placement engine 304 uses to determine placements of virtual machines. If a low priority virtual machine from the power off list is placed, then that low priority virtual machine is left as being powered on. However, if the low priority virtual machine is not on a list of virtual machines to be powered on, then those low priority virtual machines are powered off. This allows conditionally available computing resources to be used by low priority virtual machines. However, upon a failover, these conditionally available resources may be reclaimed and used to power on virtual machines that have failed. The use of conditionally available computing resources may thus be provided in addition to providing a high availability system.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A system comprising:
a placement manager configured to:
determine a placement list of virtual machines to be failed over due to failure of a host in a set of hosts,
determine a power off list of virtual machines powered on to available hosts in the set of hosts, and
add the power off list to the placement list,
a placement engine configured to
determine a placement of a set of virtual machines for available hosts in the set of hosts, wherein the placement considers virtual machines in the placement list of virtual machines as being not powered on any of the available hosts; and
generate a placed list of virtual machines based on the placement,
wherein the placement manager is configured to:
remove virtual machines in the power off list from the placed list of virtual machines,
generate power off requests for virtual machines in the power off list but not in the placed list of virtual machines, and
generate power on requests for virtual machines remaining in the placed list of virtual machines.

2. The system of claim 1, wherein the power off list includes virtual machines powered on to computing resources considered conditionally available, the conditionally available computing resources being reclaimable upon the failure.

3. The system of claim 1, wherein:
the virtual machines to be failed over include virtual machines of a first sub-priority and a second sub-priority,
the placement list is sorted in an order of the virtual machines of the first sub-priority, the virtual machines in the power off list, and the virtual machines of the second sub-priority, and
the placement engine performs placement in the order of the virtual machines of the first sub-priority, the subset of virtual machine currently powered on to available hosts, and the virtual machines of the second sub-priority.

4. The system of claim 3, wherein the power off list is sorted based on a size of the virtual machines in the power off list, the sorting causing virtual machines in the power off list using less computing resources to be placed by the placement engine before virtual machines in the power off list using more computing resources.

5. The system of claim 1, wherein the placement engine considers computing resources being used by virtual machines in the powered off list as not being used to determine the placement.

6. A computer implemented method comprising:
determining a placement list of virtual machines to be failed over due to failure of a host in a set of hosts;
determining a power off list of virtual machines powered on to available hosts in the set of hosts;
adding the power off list to the placement list;
determining a placement of a set of virtual machines for available hosts in the set of hosts, wherein the placement considers virtual machines in the placement list of virtual machines as being not powered on any of the available hosts;
generating a placed list of virtual machines based on the placement;
removing virtual machines in the power off list from the placed list of virtual machines,
generating power off requests for virtual machines in the power off list but not in the placed list of virtual machines, and
generating power on requests for virtual machines remaining in the placed list of virtual machines.

7. The method of claim 6, wherein the power off list includes virtual machines powered on to computing resources considered conditionally available, the conditionally available computing resources being reclaimable upon the failure.

8. The method of claim 7, wherein:
the virtual machines to be failed over include virtual machines of a first sub-priority and a second sub-priority,
the placement list is sorted in an order of the virtual machines of the first sub-priority, the virtual machines in the power off list, and the virtual machines of the second sub-priority; and
further comprising:
determining a placement of virtual machines in the order of the virtual machines of the first sub-priority, the subset of virtual machine currently powered on to available hosts, and the virtual machines of the second sub-priority.

9. The method of claim 8, wherein the power off list is sorted based on a size of the virtual machines in the power off list, the sorting causing virtual machines in the power off list using less computing resources to be placed before virtual machines in the power off list using more computing resources.

10. The method of claim 6 wherein the determining of the placement considers computing resources being used by virtual machines in the powered off list as not being used.

11. A non-transitory machine readable storage medium embodying computer software, the computer software causing a computer to perform a method, the method comprising:
determining a placement list of virtual machines to be failed over due to failure of a host in a set of hosts;
determining a power off list of virtual machines powered on to available hosts in the set of hosts;
adding the power off list to the placement list;
determining a placement of a set of virtual machines for available hosts in the set of hosts, wherein the placement considers virtual machines in the placement list of virtual machines as being not powered on any of the available hosts;
generating a placed list of virtual machines based on the placement;
removing virtual machines in the power off list from the placed list of virtual machines,
generating power off requests for virtual machines in the power off list but not in the placed list of virtual machines, and
generating power on requests for virtual machines remaining in the placed list of virtual machines.

12. The non-transitory machine readable storage medium of claim 11, wherein the power off list includes virtual machines powered on to computing resources considered conditionally available, the conditionally available computing resources being reclaimable upon the failure.

13. The non-transitory machine readable storage medium of claim 12, wherein:
the virtual machines to be failed over include virtual machines of a first sub-priority and a second sub-priority, the placement list is sorted in an order of the virtual machines of the first sub-priority, the virtual machines in the power off list, and the virtual machines of the second sub-priority, and further comprising:

determining a placement of virtual machines in the order of the virtual machines of the first sub-priority, the subset of virtual machine currently powered on to available hosts, and the virtual machines of the second sub-priority.

14. The non-transitory machine readable storage medium of claim 13, wherein the power off list is sorted based on a size of the virtual machines in the power off list, the sorting causing virtual machines in the power off list using less computing resources to be placed before virtual machines in the power off list using more computing resources.

15. The non-transitory machine readable storage medium of claim 11 wherein the determining of the placement considers computing resources being used by virtual machines in the powered off list as not being used.

* * * * *